United States Patent Office 2,851,475
Patented Sept. 9, 1958

2,851,475

O-ARYL PHOSPHOROAMIDOHYDRAZIDO-THIOATES

Etcyl H. Blair, Midland, Mich., assignor to The Dow Chemical Company, Midland, Mich., a corporation of Delaware No Drawing. Application April 30, 1956
Serial No. 581,362

5 Claims. (Cl. 260—461)

This invention is concerned with the O-aryl phosphoroamidohydrazidothioates having the formula

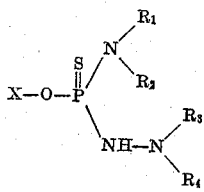

In this and succeeding formulas, X represents an aryl radical whose aromatic nucleus may contain at least one substituent selected from the group consisting of chlorine, bromine, nitro and alkoxy, $R_1$ and $R_4$ each represent hydrogen or lower alkyl, $R_2$ represents lower alkyl or cyclohexyl and $R_3$ represents hydrogen, lower alkyl or phenyl. The substituent X as used in the above formula refers to a phenyl radical or substituted phenyl radical containing one or more substituents including chlorine, bromine, lower alkyl, cyclohexyl, phenyl, benzyl, lower alkoxy or nitro. The terms "lower alkyl" and "lower alkoxy" refer to the alkyl and alkoxy radicals containing from 1 to 4 carbon atoms, inclusive. These new compounds are crystalline solids or viscous liquids, somewhat soluble in many organic solvents and of very low solubility in water. They have been found to be active as parasiticides and are adapted to be employed as active toxic constituents of compositions for the control of bacteria, fungi, mites and insect organisms such as Southern army worms and Mexican bean beetles.

The new compounds may be prepared by reacting hydrazine, phenylhydrazine or a lower alkylhydrazine with a phosphoroamidochloridothioate of the formula

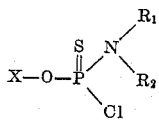

The reaction is carried out in the presence of an inert organic solvent such as benzene, toluene or methylene chloride. The reaction is somewhat exothermic and takes place smoothly at the temperature range of from 0° to 50° C. with the formation of the desired product and hydrazine or substituted hydrazine hydrochloride. The temperature may be controlled by regulating the rate of contacting the reactants and by external cooling. Good results are obtained when employing at least two molecular proportions of the hydrazine reagent with each molecular proportion of the phosphoroamidochloridothioate reagent.

In carrying out the reaction, the hydrazine reagent is added portionwise to the phosphoroamidochloridothioate reagent dispersed in the reaction solvent. If desired, the hydrazine reagent may likewise be dispersed in the reaction solvent before addition to the phosphoroamidochloridothioate reagent. The addition is carried out with stirring and at a temperature of from 0° C. to 50° C.

Upon completion of the reaction, the reaction mixture is washed with water and any reaction solvent removed by evaporation or partial distillation under reduced pressure to obtain the desired product as a residue.

The following examples illustrate the invention but are not to be construed as a limitation thereof.

EXAMPLE 1

O-(2,4,5-trichlorophenyl) N-methylphosphoroamidohydrazidothioate

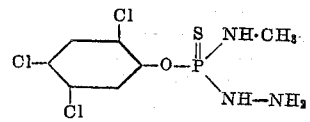

Hydrazine hydrate (10 grams, 0.2 mole) was added portionwise with stirring to a solution of 32 grams (0.1 mole) of O-(2,4,5-trichlorophenyl) N-methylphosphoroamidochloridothioate in 100 milliliters of methylene chloride. The addition was carried out in 20 minutes and at a temperature of from 20° to 30° C. After the addition, the reaction mixture was stirred for 1.5 hours at a temperature of from 20° to 32° C. to complete the reaction. The reaction mixture was then washed with water and the solvent removed by evaporation to obtain an O-(2,4,5-trichlorophenyl) N-methylphosphoroamidohydrazidothioate product as a liquid residue. Upon standing this product crystallized. The product was recrystallized from methanol and found to melt at 104°–105° C.

EXAMPLE 2

O-(2,4,5-trichlorophenyl) N-methyl-2-phenylphosphoroamidohydrazidothioate

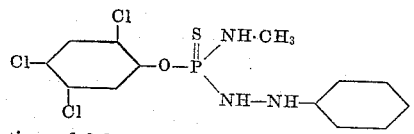

A solution of 0.2 mole of phenylhydrazine in 50 milliliters of benzene was added portionwise with stirring to a solution of 32 grams (0.1 mole) of O-(2,4,5-trichlorophenyl) N-methylphosphoroamidochloridothioate in 200 milliliters of benzene. The addition was carried out in one hour and at room temperature. Following the addition, the reaction mixture was heated at 50° C. for two hours to complete the reaction. The phenylhydrazine hydrochloride formed was then removed by filtration and the filtrate washed with benzene. Upon evaporation of the benzene an O-(2,4,5-trichlorophenyl) N-methyl-2-phenylphosphoroamidohydrazidothioate product was obtained as a crystalline solid. This product was recrystallized from methanol and found to melt at 112°–113° C.

EXAMPLE 3

O-(2,4,5-trichlorophenyl) N,2,2 - trimethylphosphoroamidohydrazidothioate

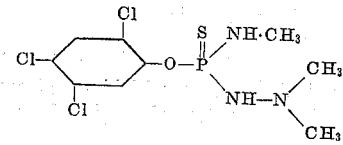

A solution of 12 grams (0.2 mole) of 2,2-dimethylhydrazine in 50 milliliters of benzene was added portionwise with stirring to a solution of 32 grams (0.1 mole) of O-(2,4,5-trichlorophenyl) N-methylphosphoroamidochloridothioate in 150 milliliters of benzene. The addition was carried out in 30 minutes and at room temperature. Following the addition, the reaction mixture was heated at 50° C. for one hour and then stirred for two hours while cooling to room temperature. Upon completion of the reaction, the dimethylhydrazine hydrochloride formed was removed by filtration and the filtrate washed with water. The solvent was then removed from the filtrate by distillation under reduced pressure to obtain an O-(2,4,5-trichlorophenyl) N,2,2-trimethylphosphoroamidohydrazidothioate product as a solid residue. This product was recrystallized from methanol and found to melt at 134°–136° C.

EXAMPLE 4

O-(*4-chloro-2-cyclohexylphenyl*) *N-cyclohexylphosphoroamidohydrazidothioate*

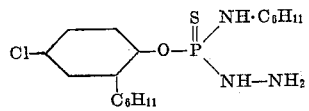

Hydrazine hydrate (5 grams, 0.1 mole) was added portionwise with stirring to a solution of 10 grams (0.28 mole) of O-(4-chloro-2-cyclohexylphenyl) N-cyclohexylphosphoroamidochloridothioate in 100 milliliters of benzene. The addition was carried out in one hour and at a temperature of 28° C. Following the addition, the reaction mixture was heated at 45° C. for one hour and then allowed to cool to room temperature. The reaction mixture was then washed with water and the benzene evaporated to obtain an O-(4-chloro-2-cyclohexylphenyl) N-cyclohexylphosphoroamidohydrazidothioate product as a white solid. This product was recrystallized from methanol and found to melt at 122°–123° C.

In a similar manner other O-aryl phosphoroamidohydrazidothioates may be prepared of which the following are representative:

O-(4-bromophenyl) N-ethylphosphoroamidohydrazidothioate by the reaction of hydrazine hydrate and O-(4-bromophenyl) N-ethylphosphoroamidochloridothioate.

O-(2-nitrophenyl) N,N-dimethyl - 2,2 - diethylphosphoroamidohydrazidothioate by the reaction of 2,2-diethyl hydrazine and O-(2-nitrophenyl) N,N-dimethyl phosphoroamidochloridothioate.

O-(4-methoxyphenyl) N-methyl - 2 - phenylphosphoroamidohydrazidothioate by the reaction of phenylhydrazine and O-(4-methoxyphenyl) N-methylphosphoroamidochloridothioate.

O-(4-benzylphenyl) N-ethylphosphoroamidohydrazidothioate by the reaction of hydrazine hydrate and O-(4-benzylphenyl) N-ethylphosphoroamidochloridothioate.

O-(2-biphenylyl) N-ethyl - 2,2 - dimethylphosphoroamidohydrazidothioate by the reaction of 2,2-dimethyl hydrazine and O-(2-biphenylyl) N-ethylphosphoroamidochloridothioate.

O-(2,5-dimethylphenyl) N-methylphosphoroamidohydrazidothioate by the reaction of hydrazine hydrate and O-(2,5-dimethylphenyl) N - methylphosphoroamidochloridothioate.

O-(3,4 - dichlorophenyl) N,N - diethylphosphoramidohydrazidothioate by the reaction of hydrazine hydrate and O-(3,4-dichlorophenyl) N,N-diethylphosphoroamidochloridothioate.

O-(2-chloro - 4 - tertiarybutyl) N-methylphosphoroamidohydrazidothioate by the reaction of hydrazine hydrate and O-(2-chloro-4-tertiarybutyl) N - methylphosphoroamidochloridothioate.

The new O-aryl phosphoroamidohydrozidothioates are effective as fungicides and parasiticides and are adapted to be employed for the control of fungi such as *Alternaria solani* and many household and agricultural pests. For such use the products may be dispersed on a finely divided carrier and employed as dusts. The new products may also be employed in oils, as constituents in water emulsions or in water dispersions. In a representative operation 100 percent controls of Southern army worms, Mexican bean beetles, two-spotted spider mites and houseflies have been obtained with aqueous compositions containing two pounds of O-(2,4,5-trichlorophenyl) N-methyl - 2 - phenylphosphoroamidohydrazidothioate per 100 gallons of water.

The O-aryl phosphoroamidochloridothioates employed as starting materials may be prepared by the reaction at a temperature of from —10° to 50° C. of two molecular proportions of a lower alkyl amine or cyclohexylamine and one molecular proportion of an O-aryl phosphorodichloridothioate. In carrying out the reaction, a benzene solution of the amine is added portionwise to the phosphorodichloridothioate reagent dissolved in benzene. This operation is carried out with stirring and at the reaction temperature. Upon completion of the reaction, the amine hydrochloride is filtered off and the benzene removed by evaporation to obtain the desired product as a residue.

I claim:

1. A phosphoroamidohydrazidothioate having the formula

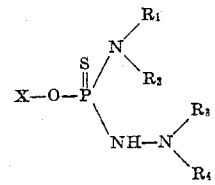

in which X represents an aryl radical of the benzene series whose aromatic nucleus may contain at least one substituent selected from the group consisting of chlorine, bromine, nitro and lower alkoxy, $R_1$ and $R_4$ each represent a member of the group consisting of hydrogen and lower alkyl, $R_2$ represents a member of the group consisting of lower alkyl and cyclohexyl and $R_3$ represents a member of the group consisting of hydrogen, lower alkyl and phenyl.

2. O-(2,4,5-trichlorophenyl) N-methylphosphoramidohydrazidothioate.

3. O-(2,4,5-trichlorophenyl) N-methyl-2-phenylphosphoroamidohydrazidothioate.

4. O-(2,4,5 - trichlorophenyl) N,2,2 - trimethylphosphoroamidohydrazidothioate.

5. O-(4-chloro-2-cyclohexylphenyl) N-cyclohexylphosphoroamidohydrazidothioate.

References Cited in the file of this patent
UNITED STATES PATENTS 2,552,538    Drake et al. _____ May 15, 1951

OTHER REFERENCES

Autenrieth et al.: "Chem. Abstracts," vol. 19 (1925), page 2325.

"The Van Nostrand Chemist's Dictionary," Van Nostrand Co., Inc., New York, N. Y., second printing (October 1953), pages 41, 42 and 44.

"The Condensed Chemical Dictionary." Reinhold Publishing Corp., New York, N. Y. fifth edition (1956), page 114.